(12) United States Patent
Ramfelt et al.

(10) Patent No.: US 6,731,652 B2
(45) Date of Patent: May 4, 2004

(54) DYNAMIC PACKET PROCESSOR ARCHITECTURE

(75) Inventors: Lars Håkan Ramfelt, Palo Alto, CA (US); Simon Assouad, Fremont, CA (US)

(73) Assignee: Metro Packet Systems Inc., Palo Alto, CA (US)

( * ) Notice: Subject to any disclaimer, the term of this patent is extended or adjusted under 35 U.S.C. 154(b) by 510 days.

(21) Appl. No.: 09/803,344

(22) Filed: Mar. 9, 2001

(65) Prior Publication Data

US 2002/0110122 A1 Aug. 15, 2002

Related U.S. Application Data

(60) Provisional application No. 60/268,813, filed on Feb. 14, 2001.

(51) Int. Cl.[7] .......................... H04L 12/28; H04L 12/00; H04L 12/86
(52) U.S. Cl. ..................... 370/489; 370/395.5; 370/392; 370/419; 370/429; 370/463; 712/226
(58) Field of Search .............................. 370/389, 395.5, 370/469, 351, 352, 392, 395.1, 395.54, 395.7, 395.71, 396, 412, 419, 420, 422, 423, 429, 462, 463, 465, 401, 474; 709/238, 250, 251; 712/226

(56) References Cited

U.S. PATENT DOCUMENTS 6,496,935 B1 * 12/2002 Fink et al. ................... 713/201
6,598,034 B1 * 7/2003 Kloth ........................... 706/47
2002/0120828 A1 * 8/2002 Modelski et al. ........... 712/200

* cited by examiner

Primary Examiner—Hassan Kizou
Assistant Examiner—Ahmed Elallam
(74) Attorney, Agent, or Firm—Rolf Fasth; Fasth Law Offices

(57) ABSTRACT

The packet processor system has a port for receiving packets from a first network. A line interface unit is connected to the port for determining the types of packets that are received by the port. A generic pipeline stage assembly is connected to the line interface unit and includes a plurality of generic pipeline stages each having a request engine for sending lookup requests to a lookup engine and a modifier engine for receiving lookup results from the lookup engine. A packet memory is connected to a last generic pipeline stage of the generic pipeline stage assembly and an output line interface unit is connected to the packet memory and a second network.

13 Claims, 5 Drawing Sheets

DYNAMIC PACKET PROCESSOR ARCHITECTURE

This application claims the benefit of Provisional Application No. 60/268,813, filed Feb. 14, 2001.

TECHNICAL FIELD

The present invention relates to a dynamic packet processor architecture that includes generic pipeline stages which may handle a variety of packet information.

BACKGROUND AND SUMMARY OF THE INVENTION

Most conventional packet processors based systems, such as L2/L3/L4 switches and routers, include separate static and pre-defined input filters, route filters and output filters. Each filter is often only designed to perform one specific function and cannot handle a wide range of functions. Conventional router/switch systems are also designed to handle a predetermined number of processing steps.

Specialized processors and dedicated hardware are currently used to perform packet processing in today's routers and switches. Each of these approaches represents some advantages and limitations. While specialized processors provide the flexibility to support new protocols and packet flows, they cannot handle line speed processing rates. The opposite is true for specialized hardware where flexibility is very limited but they can handle line speed processing rates.

If for example, the conventional packet processor based system has three fixed filters and is designed to handle three stages and the packet is non-conforming in that it requires more than three stages, then the conventional router systems cannot easily handle such a request and requires complicated re-looping mechanisms that dramatically slow down the processing of the non-conforming request. In many cases, the lookup tables of the input filters are relatively small which limits the global functionality and system flexibility. The approach of relying on a fixed number of filters that are each designed for a specific function unduly limits the flexibility and performance of the system when the required stages of incoming packets are not conforming to the specific design of the system. It is also often cumbersome to rely on many different specialized filters instead of generic filters that may handle almost any type of incoming packet type, packet flow and input port type.

The dynamic processor of the present invention provides a high degree of packet processing flexibility at line speed rates. More particularly, the dynamic packet processor architecture of the present invention includes a generic pipeline stage assembly in which every pipeline stage may be dynamically configured partly depending upon the packet type, the packet flow requirements and the input/output port type. In this way, the generic pipeline stages may be adjusted to the required processing stages and is designed for any packet flow, packet type and input/output port type. The input port types may, for example, include ethernet, POS (Packet Over Sonet), DTM (Dynamic Transfer Mode) and raw data. The raw data may be any input that is not using a predefined network protocol, i.e., voice data received by an E1/T1 framer. The configuration may be performed on a per packet flow basis so that, for example, the same stage may function as an input filter, route filter or as an output filter, as required.

DETAILED DESCRIPTION

With reference to FIGS. 1–7, the processor architecture of the present invention is suitable for a variety of network systems and the dynamic transfer mode (DTM) topology is only mentioned as a suitable example of an application. In other words, the generic distributed architecture of the present invention is suitable and optimized for, but not limited to, DTM systems. Every packet that is received initiates a task that requires processing. The task includes the full packet and some overhead information. The task then traverses a generic routing pipeline where the task is modified based on the routing lookup results received by different pipeline stages along the path. At the end of the pipeline, the task may be written into a memory to allow the backplane output interface unit to read it out and send it over the DTM backplane or over any other suitable interface. On the transmit side of the architecture, the packet may traverse a similar path from the backplane interface unit to the front end unit.

Figure 1:
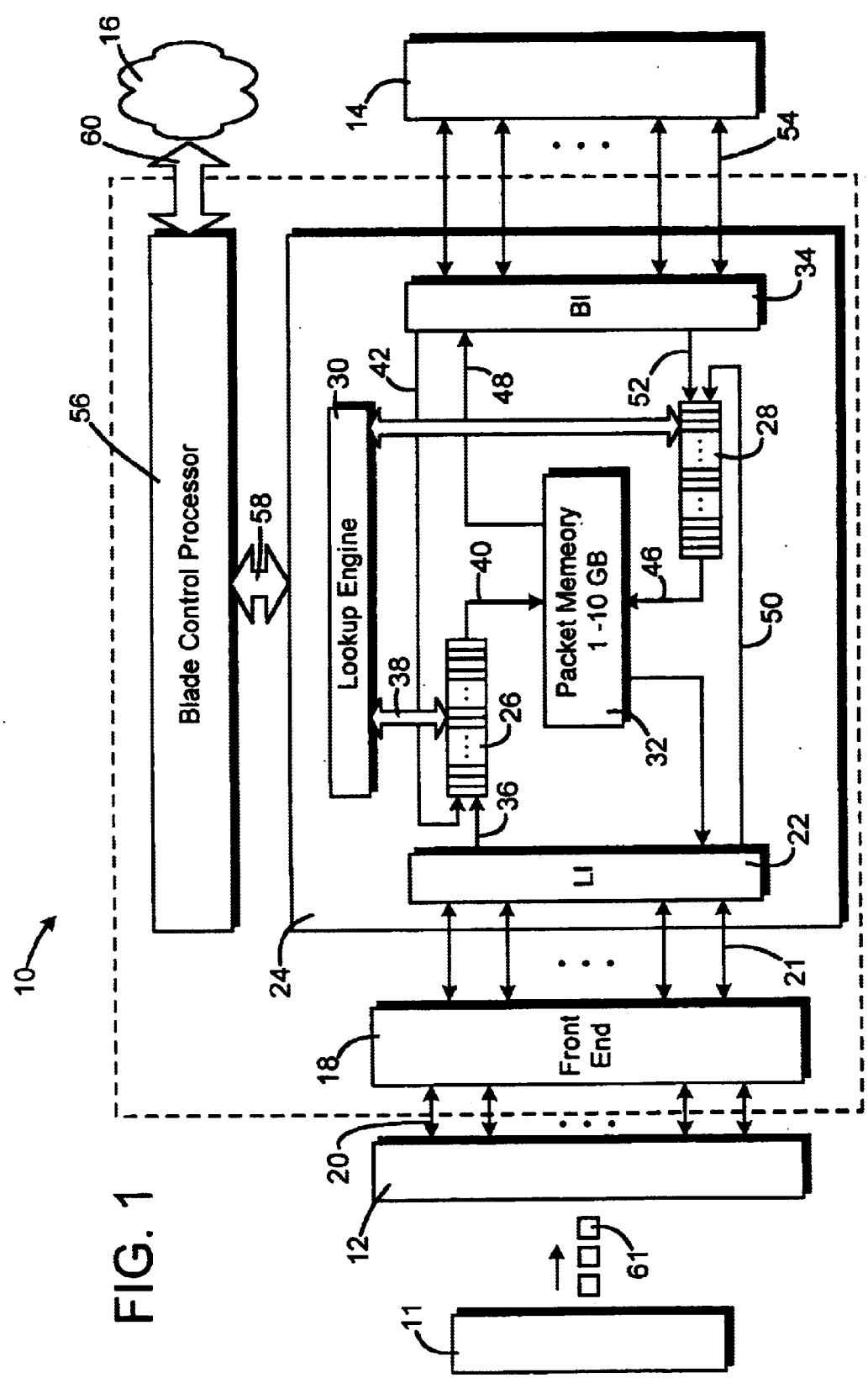
FIG. 1 is a schematic block diagram of a packet processor system of the present invention.

FIG. 1 schematically illustrates a packet processor blade system 10 that is connected to an I/O port unit 12, a DTM backplane unit 14 and a CPU host 16 that is part of a central main CPU that communicates with all the nodes of the DTM backplane unit 14. The system 10 could, for example, be a component of a node that is connected to a DTM ring or bus topology so that the system could receive information, such as information packets, from the outside and inside of the DTM node topology. All nodes in the backplane unit 14 are local but the host 16 is in communication with all the nodes through a different path. As explained in detail below, the system 10 may be used to determine, based on the packet information coming in through an incoming line interface, to which node an outgoing line interface should forward the packet information.

The unit 12 may be connected to any suitable user unit that carries information to and from the unit 12 such as ethernet, POS (packet over sonet), DTM (dynamic transfer mode) or raw data. The I/O port unit 12 may be connected to a front end unit 18 via two-way connectors 20 or copper traces using a printed circuit board. For example, the front end unit 18 may be a MAC/PHY device. The front end unit 18 may be used to determine if the incoming packet are valid and supported by the system 10. Preferably, the front end unit 18 is connected, via two-way connectors 21 to a line interface unit 22 of a dynamic packet processor 24. In this way, the line interface unit 22 may be the interface between the front end 18 and the packet processor 24.

One function of the line interface unit 22 is to convert an incoming packet 61 to a task and to determine which type the incoming packet is and what would be the first instruction to perform on the task. The task may be a block of data created from the original packet by the line interface unit 22 that may be modified by one or a plurality of pipe line stages in the pipeline assembly 26. The task is the actual data that traverses the pipeline stages and has a variable but limited length.

As indicated above, when the line interface 22 receives a packet from a port at the front end 18, the line interface 22 generates the task containing the full packet and additional task overhead (TOH) information. In this way, the packet will not be stored in the packet buffer until it traverses the routing pipeline stages in the pipeline assembly 26. Therefore, the packet ordering within a flow can be guaranteed without special handing. Every valid packet received by the line interface unit 22 will generate a task. By transforming an incoming packet to a task, unnecessary information that is not required by the packet processor 24, is removed from the packet.

In addition to the line interface unit 22 and the first generic pipeline stage assembly 26, the packet processor 24 includes a second generic pipeline stage assembly 28 for transmission, a single lookup engine or multiple lookup engines unit 30, a packet buffer/memory 32 and a backplane interface unit 34. The pipeline stage assemblies 26, 28 are generic and can handle virtually all incoming tasks. The pipeline assemblies 26, 28 include routing pipeline stages that can be dynamically instructed to perform a specific function on a per packet/task basis. For increased system flexibility, and to be able to support future protocols, an un-supported task may be sent to the local blade processor automatically. As described below, each assembly has a plurality of identical generic pipeline stages. All lookup requests from the pipeline stage assembly 26 are handled by the lookup engine 30 for interface rates up to several million lookups per second. With currently available technology, it is possible to build a lookup engine that can handle 150 million lookups per second.

The pipeline stage assembly 26 is connected to the interface unit 22 via an one-way RBUS bus 36 and to the lookup engine unit 30 via a two-way bus 38. The pipeline stage assembly 26 is also connected to the packet memory 32 via an RFQI bus 40 and to the backplane interface 34 via a bus 42.

The bus 42 may be used if a particular packet needs more stages than the available number of stages in the assembly 26. The extra stages may be performed by the assembly 26 in a second loop. In this way, when the backplane line interface 70 retrieves a packet from the packet memory 32 and realizes that all the steps are not completed, the interface 70 may send back the packet via the bus 42 to take care of the uncompleted stages in the assembly 26. It should be noted that this procedure does not require additional memory for partially processed packets.

The packet memory 32 is connected back to the line interface 22 via a TLQI bus 44, to the second pipeline stage assembly 28 via an TFQI bus 46 and to the backplane interface 34 via an RLQI bus 48. The second pipeline stage assembly 28 is connected to the line interface 22 via a bus 50 and to the backplane interface 34 via the TBUS bus 52. The backplane interface 34 may be the interface between the packet processor 24 and the DTM back plane 14. The interface 34 is connected to the DTM backplane 14, or any other suitable network, via two-way buses 54.

The dynamic packet processor 24 is connected to a blade control processor 56 via a two-way bus device 58. The processor 56 is connected to the host CPU 16 via a two-way bus 60. The processor 56 is responsible for updating the memory content of the lookup engine 30 and for configuring the packet processor 24. The processor 56 is the interface between the host processor 16 and the packet processor 24 and does not require a significant processing power to perform its basic functions.

When the system 10 receives an incoming packet 61 through the I/O port 12, the packet 61 will pass to the front end 18 via the bus connectors 20 and into the line interface 22 via the bus connectors 21. The line interface 22 converts the packet 61 to a task and forwards the task, via the bus 36, to the first pipeline stage assembly 26. One function of the line interface 22 is to control the way the incoming tasks are distributed to the pipeline stage assembly 26 by analyzing the overhead of the task. The overhead includes instructions regarding which functionality/purpose or type of process that are required for the packet 61. The overhead is changing as the information is passed through the pipeline stage assembly 26. The overhead may include instructions about what is required in the next step of the process. For higher I/O performance, it is possible for the line interface 22 to interface with multiple pipelines 26 for a distributed processing architecture.

Depending on the input port type and the packet type, the packet processor 24 needs to perform specific filtering tasks in a given order at each processing stage of the packet Therefore, every packet flow has a predefined processing path with different pipeline stages and lookup numbers. To be able to handle all types of packet and input ports listed in the design requirements, without having to build complicated multi-branch pipelines, the generic pipeline stage assembly 26 can perform all of the required filtering tasks.

A typical first overhead instruction may be to filter the task information. The pipeline stage assembly 26 may be designed to conduct some flow level filtering at a low level so that, for example, the assembly 26 may drop all tasks that have been sent from a particular port. The pipeline stage assembly 26 is also designed to conduct higher level filtering such as route filtering and input filtering. As explained in detail below, if the task is passed through an input filter, the lookup may provide information about whether the task should be dropped or not. If, for example, the task is passed through a route filter, the lookup may provide information about where the packet should be sent. A lookup for an output filter may determine which channel or port should be used on the DTM backplane. Other types of lookup types include encapsulation and decapsulation lookups that determine if the task needs to be encapsulated or decapsulated before it is sent into the DTM backplane 14. The lookup results may also provide information related to the type of encapsulation/decapsulation that is needed and what additional information that encapsulation includes and the next hop address of the task/packet. There are different protocols for the various encapsulation/decapsulation procedures. The hop address refer to the IP (Internet Protocol) address of the next router.

In general, each stage in the generic pipeline assembly 26 receives tasks at line speed and variable length from the previous stage or line interface with pre-defined instructions. Since this is a cut-through architecture, it is possible to have variable length tasks without performance penalty or buffer size limitations. For every lookup request, the pipeline stage receives back lookup results that include the computations or modifications that need to be performed and the next instructions to be performed. The pipeline stage applies the modified instructions accordingly and sends out the modified task with the next instruction to the next pipeline stage.

More particularly, the task traverses through each stage of the pipeline stage assembly 26. In each stage, the overhead of the task includes instructions about what needs to be performed in each particular stage. For example, the instructions may relate to the type of lookup and modifications that are required. As indicated above and described in detail below, the payload of the packet is forwarded to the FIFO buffer for buffering while the lookup engine 30 looks up the information requested by the stage assembly 26 in a database.

Figure 2:
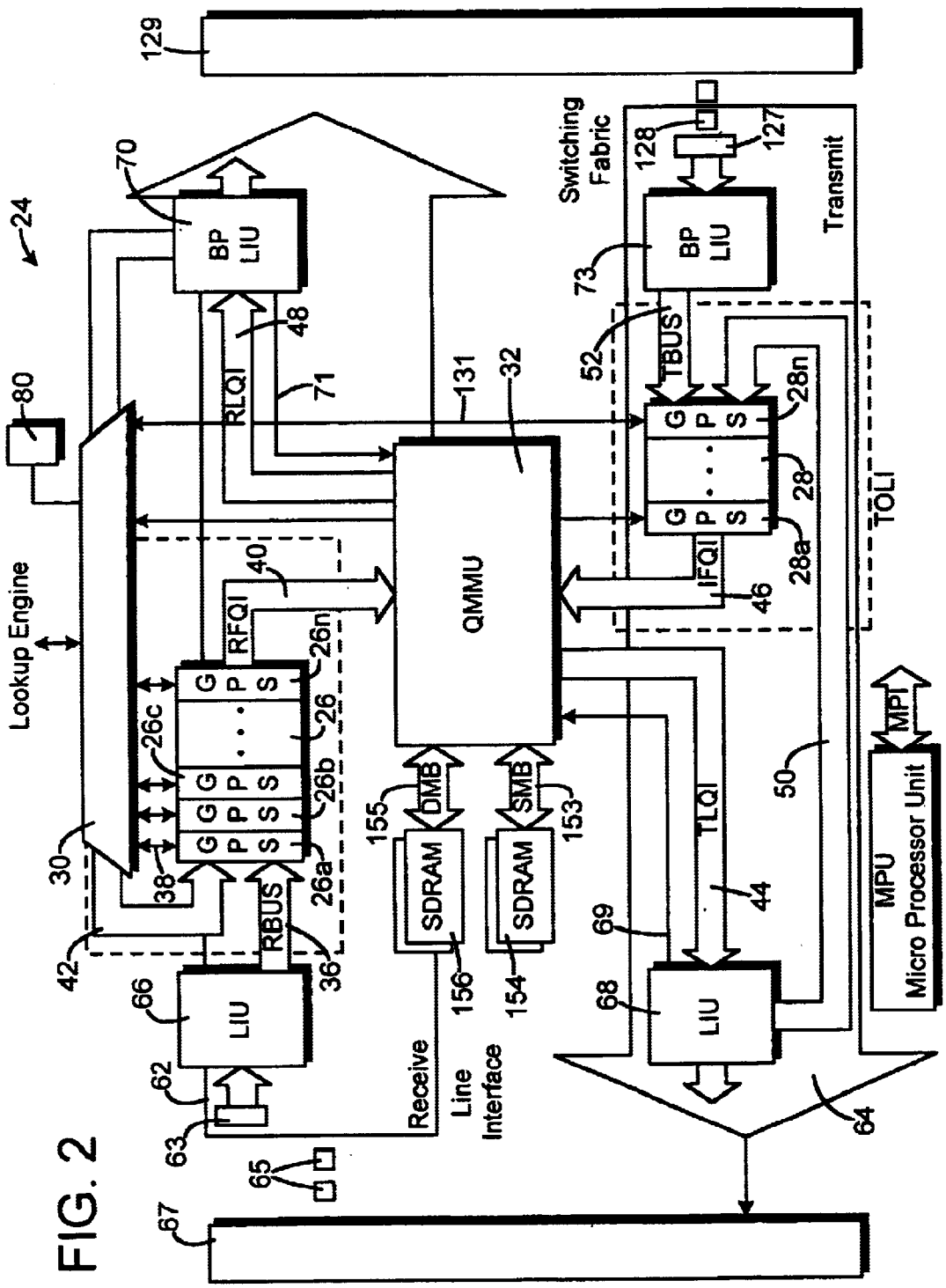
FIG. 2 is a schematic block diagram of the dynamic packet processor of the present invention.

FIG. 2 is a more detailed schematic view of the packet processor 24 that has a receiving portion, as indicated by a thick receiving arrow 62 directed in a first direction, and a transmitting portion, as indicated by a thick transmitting arrow 64 directed in a second direction that is opposite the first direction. The white arrows represent transfer of packets/tasks from one component to another component of the packet processor. Both the transmit and receive portions together form the packet processor.

The line interface 22 of FIG. 1 may be divided into a receiving line interface 66 and a transmitting line interface 68. Similarly, the backplane interface 34 of FIG. 1 may be divided into a receiving backplane interface 70 and a transmitting backplane interface 72. As explained below, the backplane interface 70 may retrieve packets stored in the QMMU 32 by sending a retrieval signal 71 that includes a correct descriptor for the required packet and the amount of data requested. The line interface unit 68 may retrieve packets from the QMMU 32 by sending a signal 69 that includes the correct descriptor for the required packet.

The pipeline stage assembly 26 contains a plurality of identical generic pipeline stages 26a–26n. An important feature of the present invention is that each pipeline stage is identical and can handle a wide range of functions. However, the last stage 26n may be slightly different in that it may need to change the task into a packet format with descriptors that are suitable for being written into the memory. It is necessary to include a plurality of generic pipeline stages in the pipeline stage assembly 26 because certain packets may require more than one generic pipeline stage if many lookup functions are required. For example, if a packet only requires two lookups, only two generic pipeline stages will be used while the task is passed through all the other pipeline stages in the assembly 26 without any lookups or modifications.

Figure 4:
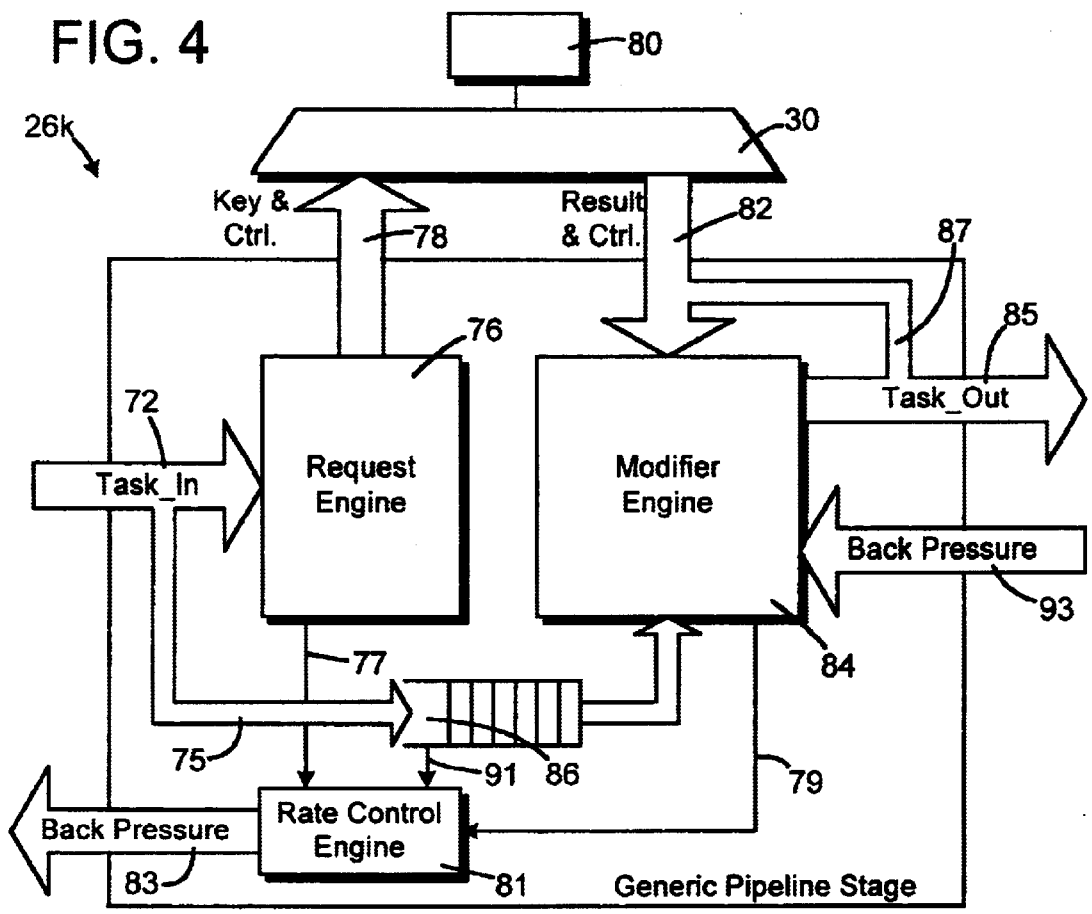
FIG. 4 is a schematic block diagram of a generic pipeline stage of the present invention.

As best shown in FIG. 4, each pipeline stage 26k receives a task 72 from either the previous pipeline stage or if the pipeline stage 26k is the first pipeline stage, the task is received from the line interface unit 22. The task 72 comprises the task overhead information that may be divided into an instruction portion and a miscellaneous overhead portion that go into the request engine 76. The instruction portion as well as portions of the packet may be read by a key extractor or key engine that reads the instruction portion. The engine 76 has access to a table that may be used to interpret the instructions in the instruction portion of the packet. If the instruction bit in the packet corresponds to a value in the table that requires no action, then the pipeline stage will not modify the packet and just read and forward the packet as it is to the next pipeline stage in the assembly. The entire task, including the payload and all the overhead information, goes into a FIFO buffer 86. It is also possible to send the entire task simultaneously into the request engine 76 so that the request engine may use the portions of the task that are needed for the lookup process.

The request engine 76 reviews the instruction portion and determines what type of processing is required. For example, the request engine 76 may determine the type of packet that originated the task 72. The originating packet may have been an IP packet so that the request engine knows that the next step is to generate a correct key 78 for the lookup engine 30 so that the correct lookups are performed by the lookup engine for the particular IP packet. The request engine 76 may have a destination address but does not know which route the packet with the specified IP destination address should take. The lookup engine 30 may provide this type of information. If the incoming task 72 is based on an IP packet, then the instruction portion may include information related to the source address, the destination address and other fields of information. The lookup engine 30 determines who the sender is and where the packet is going to. Based on a table disposed in the lookup engine 30, the engine 30 will send back a modification data signal 82 to a modifier engine 84. The signal 82 may include modify instruction for the next step in the subsequent generic pipeline stage. For example, if the lookup is a routing lookup, the signal 82 includes results related to, among other things, instructions regarding which channel is to be used, the next IP address and what the next step in the process is. The lookup results may bypass the modifier engine 84 by using a next instruction bus 87 that is linked to the bus 85.

The task may also need some modifications before it is transmitted to the destination address. In this way, the lookup engine 30 receives the key 78 and obtains the requested information from a database 80 to, for example, find out whether the output I/O should be instructed to route the task to a certain node. The task may be dropped if the sender of the packet, for example, is not permitted to transmit the packet or the receiver is not permitted to receive the packet. If the lookup was related to an input filter, the results retrieved from the database and issued by the lookup engine 30 may include information whether the task should be dropped or not. An important feature of the present invention is that the results from the lookup engine 30 depends upon the requested function submitted to the lookup engine. The requested function, in turn, depends on the type of the incoming packet and what processing needs to be performed. Therefore, any stage may request any lookup type and handle any possible modification.

Preferably, the entire task 75, including the payload and task overhead, goes into the FIFO buffer 86 and remains in the buffer while the lookup engine 30 processes the instruction portion. The buffer 86 may store several tasks while the lookup engine 30 processes a plurality of tasks to compensate for the delay between submitting a request to the lookup engine 30 and obtaining a result from the lookup engine 30.

In certain cases, the request engine 76 may be congested and cannot process the incoming tasks for any reason. A rate control engine 81 may inform the previous pipeline stage 26j via a backpressure bus 83 to the previous modifier engine that the pipeline stage 26k is congested and the previous pipeline stage may stop sending tasks to the pipeline stage 26j. The request engine 76, the modifier engine 84 and the FIFO buffer 86 may send signals 77, 79, 91 respectively, to the rate control engine 81 when congestion occurs. For example, when the buffer 86 is filled to capacity, the buffer 86 may generate the signal 91. Any lookup results that arrive to the modifier engine 84 from the lookup engine 30 during this time may be internally stored in the modifier engine 84 until the congestion problem has been resolved. When the upstream pipeline stages receive congestion signals from downstream pipeline stages, the upstream pipeline stages will slow down or delay the sending of tasks until the temporary congestion has been resolved. If the congestion is not resolved, tasks must be dropped from the pipeline stages. Similarly, the modifier engine 84 may be connected to a downstream rate control engine via a back pressure bus 93.

As the results are obtained for each task by the modifier engine 84 from the lookup engine 30, the modifier engine 84 retrieves the corresponding payload of the same task from the buffer 86, according to the first-in-first-out (FIFO) principle. The modifier engine 84 then sends a modified task 85 to the next generic pipeline stage, if more lookups are required, or directly to the queue management unit if no more lookup is required. Based on the look up results, the modifier engine may modify not only the packet but also the task overhead information before the modified task is forwarded to the next pipeline stage. The modified packet may also include new instructions for the next generic pipeline stage based on the lookup results. When no more lookups are required according to the instructions for the task, the modified tasks may go through the entire pipeline stage assembly without any lookup procedures being performed and without any modifications to the packet. However, the task instructions may include instructions, other than lookups, such as sending the task to the CPU or that the task should be dropped so that the next pipeline stage will not receive the modified task.

Figure 3A:
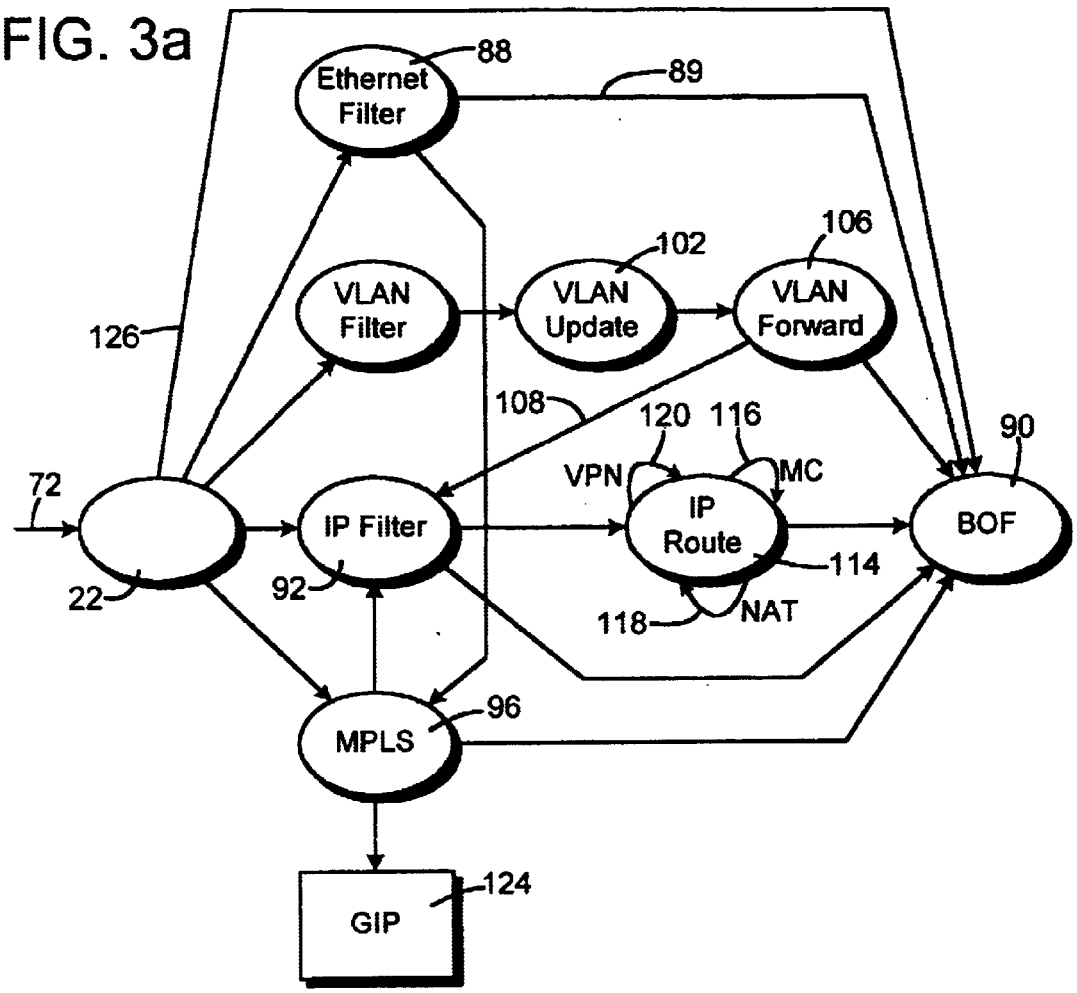
FIGS. 3a/3b are schematic flow diagrams of the various states in a pipeline stage of the present invention.

FIG. 3a schematically illustrates examples of functions that may be requested in the pipeline stages 26 as a result of the incoming task 72. Each state in FIG. 3a represents a pipeline stage in the assembly 26. As indicated in FIG. 3a, depending upon the type of packet and the overhead instructions, the task may require a plurality of stages before reaching the backplane output filter 90. In other words, a packet may require more than one pipeline stage depending upon its type and flow. There are a wide variety of packet types. Incoming and outgoing packets with layer 2 headers may be of type ethernet, DTM, and POS. The functionality supported at layer 3, may include IP forwarding, IP routing, VPN encapsulation, VPN decapsulation, MPLS encapsulation, MPLS decapsulation, and raw data encapsulation.

If the incoming packet is an ethernet packet, the ethernet filter 88 may filter the task according to the ethernet address header in layer 2. Depending upon the lookup results, the next step may be to remove the layer 2 header and proceed with the task, with layer 3 active header, or drop it. Once the layer 2 has been removed, the lookup results may provide instructions that the layer 3 task requires an encapsulation or decapsulation of the MPLS section of the packet.

If the packet does not require IP processing at layer 3, it may be bridged directly to the backplane output filter 90. The backplane output filter 90 may provide channel identification information about which channel to use on the DTM backplane 14. The filter 90 cooperates with a DTM protocol software that assigns the best channel to the outgoing tasks.

If the incoming packet is an ethernet packet that requires special processing, such as ethernet bridging, the instruction, with some of the layer 2 fields may be sent, as a key, for a lookup through a VLAN filter 94 that determines if the VLAN packet should be dropped or processed. When performing an ethernet bridging function, it is not necessary to consider the layer 3 header information and hence, there is no need to go through the IP filter 92. If the VLAN packet is not dropped, a VLAN update unit 102 that updates a VLAN table based on the results of the lookup engine followed by a VLAN forwarding unit 106 that updates, if required, the layer 2 VLAN header and forwards the VLAN packet to the right destination. If the incoming VLAN packet is designated to the system itself (containing the packet processor), then the IP filtering will be required 92. If the VLAN packet does not need routing, the next processing step is the backplane output filter 90.

If the incoming packet is an IP packet, the instruction portion, along with some of the layer 3 fields, may be sent for lookup through an IP filter 92. The IP filter 92 process determines if the IP packet should be dropped or processed. If the IP packet is not dropped, the packet may proceed to an IP route unit 114 to obtain the next IP address. The unit 114 may do some further processing if, for example, encapsulation is needed. The packet is processed differently depending upon whether the packet is an MPLS (Multi-Protocol Label Switched) packet, a multicast packet 116, a packet that requires NAT (network address translation) 118 or a (VPN) virtual private network packet 120. Each type may require additional lookups.

Following the IP filter 92, a task may be sent directly to the backplane output filter 90 if all the routing information was available from the line interface and the IP filter result. The direct forwarding speeds up the forwarding since the number of processing stages is kept to a minimum.

If the incoming packet is a MPLS packet that needs encapsulation or decapsulation, the next processing stage of the task is the MPLS filter 96. A CPU unit 124 may be activated if the incoming packet is a type that is not supported by the processor. It may also be possible to conduct a lookup and obtain the next address without taking away the MPLS header and send the packet directly to the backplane output filter 90. Depending upon the lookup results, the MPLS filter may also be used if, for example, raw data needs MPLS encapsulation.

If the incoming packet was first categorized as an ethernet packet but after further analysis the packet was a MPLS packet, the instruction portion may be sent to the MPLS filter 96 so that the packet is using an MPLS encapsulation.

To minimize the database complexity for the lookups, the lookups only provide each step or only a few steps are provided at each lookup. The database would be substantially larger if all the steps required are provided with only one lookup.

It is possible to bypass the above-described lookup procedures depending upon the incoming packet type. The packet may be sent by the line interface unit 22 directly to the backplane output filter 90 when it is important to send the information very fast. The packet is then sent on a default channel.

Figure 3B:
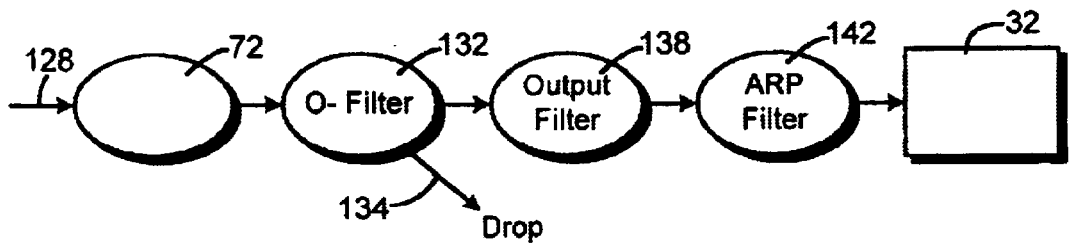

FIG. 3b illustrates the states when a packet 128 is received by the backplane interface 72 from the DTM backplane 14. The backplane interface 72 assigns a task to the incoming packet 128. The backplane interface 72 may request a lookup via a connector 131 and send the packet to a filter 132 that decides if the packet 128 should be dropped 134 or not. For example, the backplane interface 72 may be instructed to block all packets that have been sends from a particular port of a particular node in the DTM backplane 14. If the instruction portion of the task that is based on the incoming packet 128 indicates that the task should be processed further, the task may be forwarded to an output filter 138 that may decided which port should be used and an address resolution packet filter 142 converts the address from an IP address to an I/O address before the task is sent to the packet memory 32.

Figure 5:
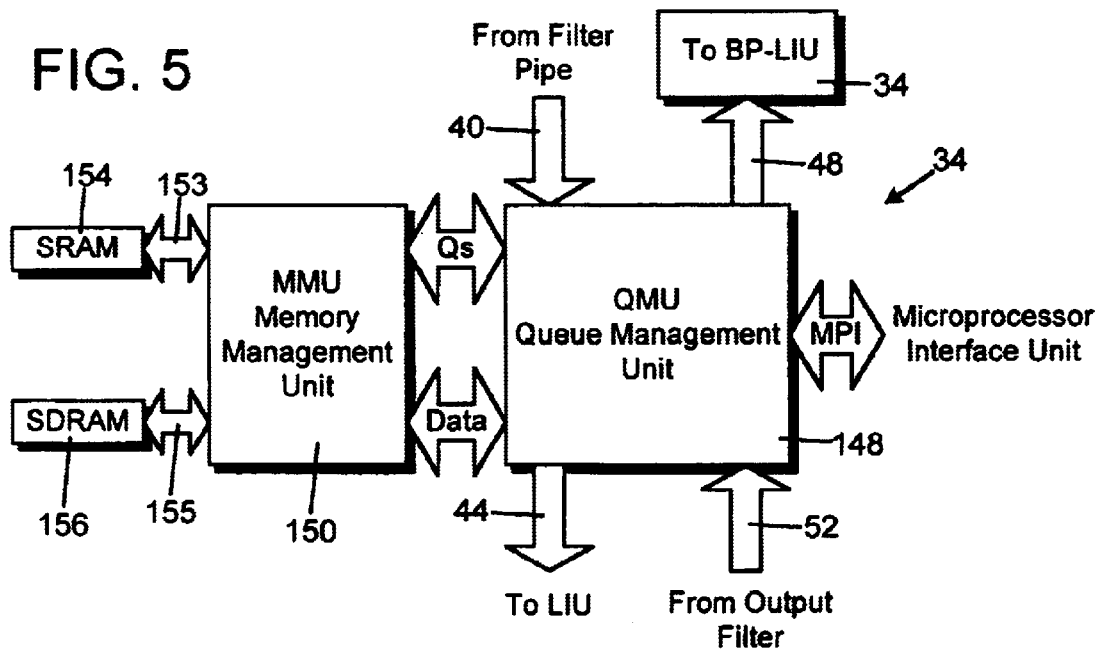
FIG. 5 is a schematic block diagram of a queue and memory management unit of the present invention.

FIG. 5 is a schematic block diagram of the packet memory 32 including a queue management unit 148 and a memory management unit 150. The queue management unit 148 handles buffer allocation and management for packet payload and deals with a descriptor's head pointer list 161 and a descriptor's tail pointer list 163, as explained below, to determine what is the beginning and the end of every available queue. The descriptors are fixed in size and provide a link to the payload buffer. The descriptors are requested by the last pipeline stage 26n when a task is ready to be written into the packet memory 32.

Every processed packet needs to have at least one descriptor allocated in the packet memory 32. Normally, packets have a single descriptor. However, it is possible to have multiple descriptors per task, i.e., multicast packet. Each descriptor is written once into the packet memory 32 and read once. The backplane output filter 70 provides instructions on which queue the packet should be attached to.

The memory management unit 150 interfaces to an SRAM 154 for queues storage and an SDRAM buffer memory 156 for tasks/packets and descriptors storage. The memory management unit 150 primarily deals with descriptors and the payload memory. The SDRAM buffer memory 156 is logically divided into 32 Kbytes buffers. Each buffer may be used for storing descriptors and packet payload simultaneously. A low speed agent, that runs inside the packet memory 32, provides empty buffers in 32 Kbytes portions when needed. In addition to the SDRAM buffer memory 156, that contains the descriptors and packet payload, separate memory resources are required for memory management purposes. At least two SRAM blocks are required to hold the descriptor's head address and tail address, respectively. A third SRAM block may be required to store a buffer reference count and the head and tail address counts. The third SRAM block may be needed when the payload size is variable and may be used to indicate when a 32 Kbytes buffer in the SDRAM buffer memory 156 may be recycled.

A packet with a descriptor may be received by the queue management unit 148 from the last generic pipeline stage in the pipeline assembly 26 via the RFQI bus 40. The task is written and stored inside a buffer of the queue management unit 148 and a suitable descriptor will be developed that is stored next to the task. The descriptor will have information about at which address the task is stored and its length so that the output line interface can easily find the task via the descriptor in the unit 148. Additionally, each descriptor contains a pointer to the next descriptor's location. In this way, every active queue will have a chain of descriptors with first and last descriptors' pointers stored in head and tail pointer list, respectively. Each output channel/queue has its own descriptor chain. The output line interface may have multiple queue accesses. Each queue has a chain of descriptors, so when one descriptor is read and completed the line interface may go to the next descriptor. For each queue stored in the SRAM 154 there is a head and tail address. In this way, the output line interface may tack the queue chain.

Figure 6:
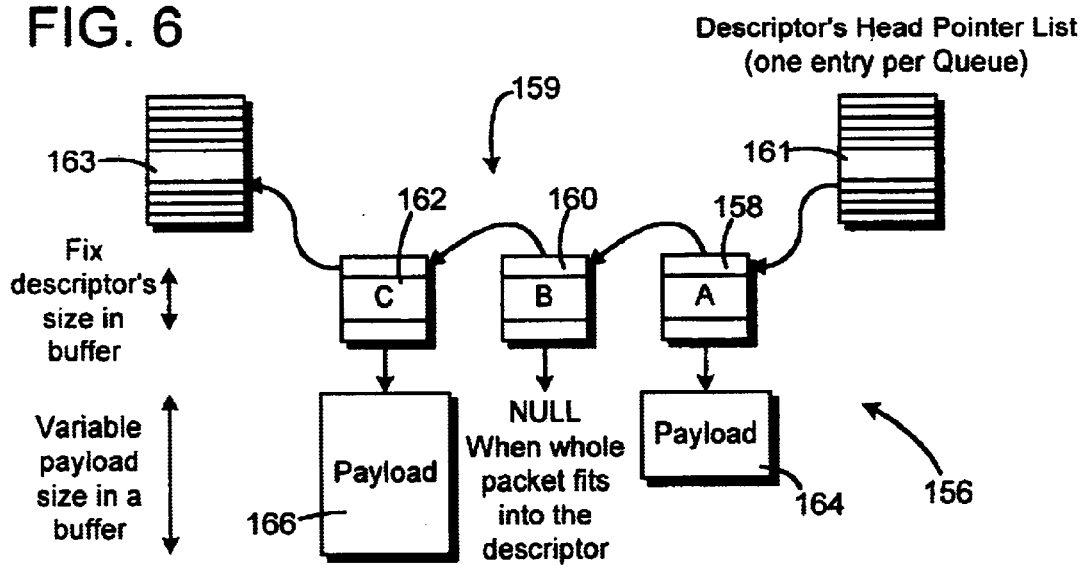
FIG. 6 is a schematic flow diagram of a descriptor chain of the present invention.

As illustrated in FIG. 6, the SDRAM 156 may include a queue of descriptors that are used by the output line interface to find the packets in a memory pool. The descriptors 158, 160 and 162 may be stored in the SDRAM memory buffer 156 and take up a fixed size allocated in the SDRAM memory buffer 156. Every descriptor is only pointing to one packet stored in the memory. For example, the descriptor 158 may be linked to a packet payload 164 and the descriptor 162 may be linked to a different packet payload 166. It should be noted that the size of the packet payload may vary so that a large packet payload may take up more buffer space than a small packet payload.

The descriptors 158, 160, 162 form a chain 159 that starts with a header that is included in a header pointer list 161 and ends with a tail that is included in a tail pointer list 163. The lists 161, 163 may list all the headers and tails of a plurality of queues and the chain 159 of a single queue is only used as an example. When a new packet, including its descriptor, is to be stored in a certain queue based on the lookup results, the descriptor of the new packet will be placed last in the chain 159 behind the descriptor 162 to update the queue and the new packet is written into the packet memory.

Preferably, the backplane line interface 70 reads from the descriptor's head pointer list 161 so that the first descriptor in the chain 159 is processed first by the backplane line interface 70. Similarly, the last stage in the generic pipeline stage assembly 26 reads the tail pointer list 163 to update the list 163 when a new packet enters the QMU 148 via the bus 40.

If the same packet is instructed to be associated with a multiple queues, the same packet has more than one descriptor pointing to the packet. The interface 70 must have all the descriptors in order to retrieve the packet from the memory. Each descriptor triggers the interface 70 to process one queue at a time even if the same packet is retrieved several times by different descriptors pointing to the same packet. When the last descriptor pointing to the same packet is processed by the backplane line interface then the packet buffer may be recycled. Preferably, the backplane interface 70 continuously scans the head pointer list 161 of the queues and obtains the descriptor information therefrom. The QMU 148 may also instruct the backplane interface 70 to start scanning if the system has been idle for a while. When the packet 164 and its descriptor 158 have been retrieved by the interface 70 then descriptor 160 is removed from the chain.

Figure 7:
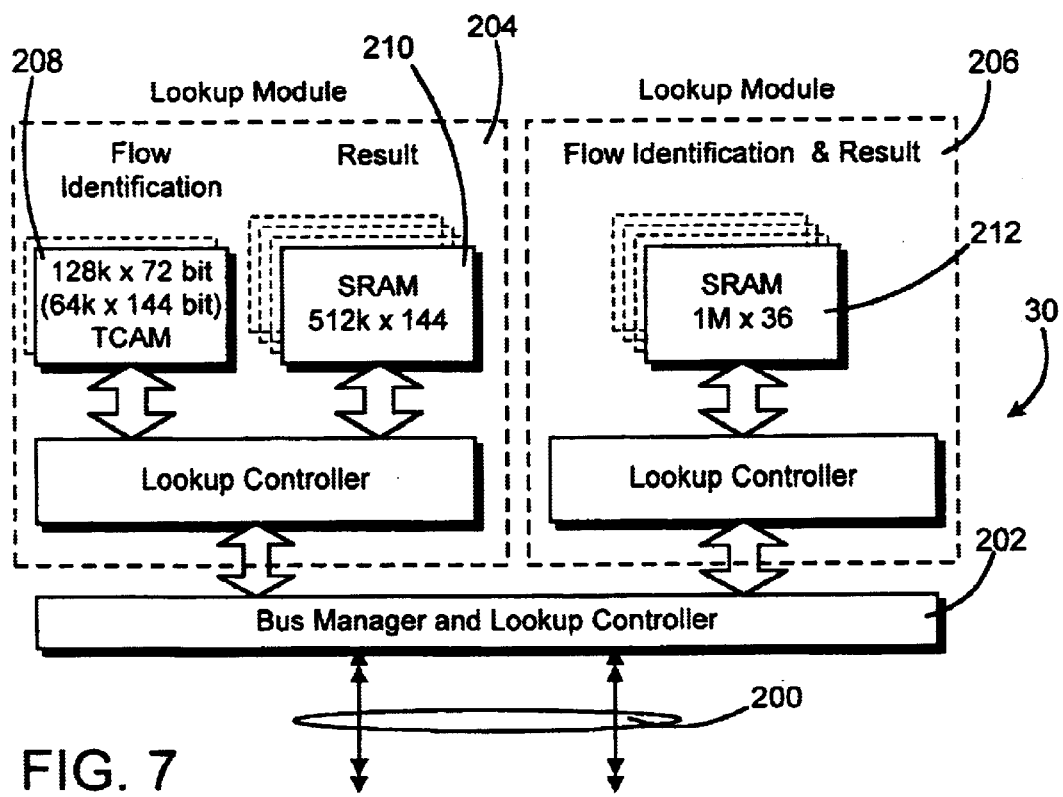
FIG. 7 is a schematic block diagram of a lookup engine of the present invention.

FIG. 7 is a schematic block diagram of the lookup engine 30. Each pipeline stage 26a–26n may initiate a lookup request to the lookup engine 30. The requests from one or many pipeline stages may be assembled in a routing engine that is responsible for multiplexing all the lookup requests from different pipeline stages to a single routing engine bus 200 that goes to a bus manager and a lookup arbiter 202 located on the lookup engine 30. The lookup arbiter 202 distributes the different requests, including lookup requests and memory access requests, to any of the available lookup modules 204, 206. For example, the lookup module 204 may include a TCAM database unit 208 and a SRAM database unit 210 while the lookup module 206 may only include a SRAM unit 212. In this way, the lookup arbiter 202 may interface the SRAM or TCAM lookup module by using the same bus 200. Therefore, if a lookup module is replaced, the lookup engine may not require any design modifications. SRAM lookup modules are generally slower than TCAM lookup modules. The lookup arbiter 202 decides which lookup module should be activated for the requests contained in the routing engine bus 200.

While the present invention has been described in accordance with preferred compositions and embodiments, it is to be understood that certain substitutions and alterations may be made thereto without departing from the spirit and scope of the following claims.

We claim:

1. A method for processing a packet in a packet processor having a line interface unit, comprising:
   the line interface unit receiving a packet;
   converting the packet into a task comprising the packet and a task overhead information;
   sending the task overhead information to a first request engine of a first pipeline stage in a generic routing pipeline assembly;

sending the packet to a packet buffer;

the first request engine receiving the task overhead information and preparing a first lookup request based on information in the task overhead information;

the first request engine sending the first lookup request to a lookup engine;

the lookup engine receiving the first lookup request and looking up new information based on the first lookup request;

the lookup engine retrieving a first lookup result comprising the new information and sending the first lookup result to a first modifier engine of the first pipeline stage;

the first modifier engine retrieving the packet from the packet buffer;

the first modifier engine modifying the packet, based on the first lookup result, to a modified packet; and the first modifier engine sending the modified packet to a second request engine of a second subsequent pipeline stage.

2. The method according to claim 1 wherein the packet memory unit stores the packet and the descriptor so that the descriptor is associated with the packet and the packet buffer is contained in the first pipeline stage.

3. The method according to claim 1 wherein the method further comprising an output line interface retrieving the packet from the packet memory unit by reviewing a queue of descriptors associated with descriptors stored in the packet memory unit.

4. The method according to claim 3 wherein the method further comprising storing the descriptors in a buffer so that each descriptor is pointing to a packet.

5. The method according to claim 1 wherein the method further comprising an output line interface reviewing a descriptor's head pointer list so that a first descriptor is first processed by the output line interface.

6. The method according to claim 1 wherein the method further comprises providing the generic routing pipeline assembly with a last pipeline stage and the last pipeline stage updating a tail pointer list of the packet memory unit with a new descriptor.

7. A packet processor system, comprising:

a receiving unit for receiving packets from a first network;

a line interface unit connected to a port for classifying types of packets received by the port;

a generic pipeline stage assembly connected to the line interface unit, the assembly comprising a generic pipeline stage having a request engine for sending lookup requests to a lookup engine and a modifier engine for receiving lookup results from the lookup engine, the lookup engine being connected to a database;

a packet memory connected to the generic pipeline stage assembly; and an output line interface unit connected to the packet memory and a second network; and the lookup engine being connected to the generic pipeline stage assembly via a bus that is adapted to contain lookup requests from a plurality of pipeline stages of the generic pipeline stage assembly, the bus being in communication with a lookup arbiter of the lookup en me that distributes the lookup requests to lookup modules disposed in the lookup engine.

8. The packet processor system according to claim 7 wherein the output line interface is connected to the generic pipeline stage assembly via a bus.

9. A packet processor system, comprising:

a receiving unit comprising:
a first port for receiving packets from a first network;
a first line interface unit connected to the first port for classifying the packets received by the first port;
a first generic pipeline stage assembly connected to the first line interface unit, the first assembly comprising a plurality of first generic pipeline stages each having a first request engine for sending lookup requests to a lookup engine and a first modifier engine for receiving lookup results from the lookup engine, the lookup engine being connected to a database;

a transmit unit comprising:
a second port for receiving packets from a second network;
a second line interface unit connected to the second port;
a second generic pipeline stage assembly connected to the second line interface unit, the second assembly comprising a plurality of second generic pipeline stages each having a second request engine for sending lookup requests to the lookup engine and a second modifier engine for receiving lookup results from the lookup engine; and a packet memory unit being connected to the first generic pipeline stage assembly via a first bus and to the second generic pipeline stage assembly via a second bus.

10. The packet processor system according to claim 9 wherein a first output line interface of the receive unit is connected to the packet memory unit.

11. The packet processor system according to claim 10 wherein the first output line interface is connected to the first generic pipeline stage assembly.

12. The packet processor system according to claim 9 wherein a second output line interface of the transmit unit is connected to the packet memory.

13. The packet processor system according to claim 12 wherein the second output line interface is connected to the second generic pipeline stage assembly.

* * * * *